Figure 1:
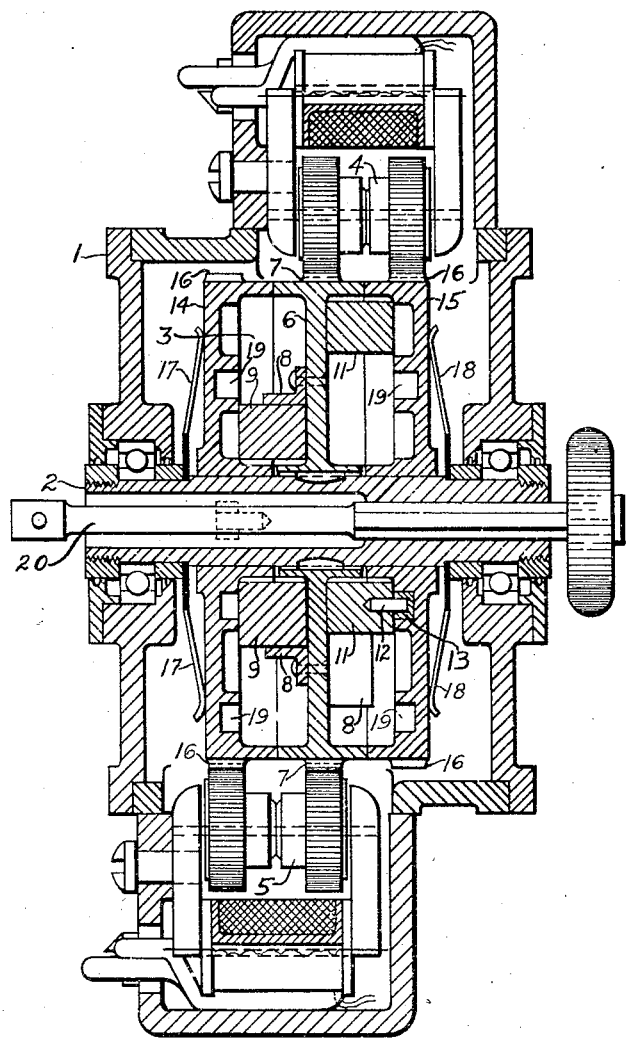

Dec. 10, 1929.　　W. E. TRUMPLER　　1,739,105
BALANCING MACHINE
Filed March 31, 1926　　3 Sheets-Sheet 1

WITNESSES:
R. S. Williams
W. D. O'Connor

INVENTOR
William E. Trumpler
BY
Wesley Carr
ATTORNEY

Dec. 10, 1929.  W. E. TRUMPLER  1,739,105
BALANCING MACHINE
Filed March 31, 1926   3 Sheets-Sheet 2

WITNESSES:
R. S. Williams
W. D. O'Connor

INVENTOR
William E. Trumpler
BY
Wesley G. Carr
ATTORNEY

Dec. 10, 1929.   W. E. TRUMPLER   1,739,105
BALANCING MACHINE
Filed March 31, 1926   3 Sheets-Sheet 3
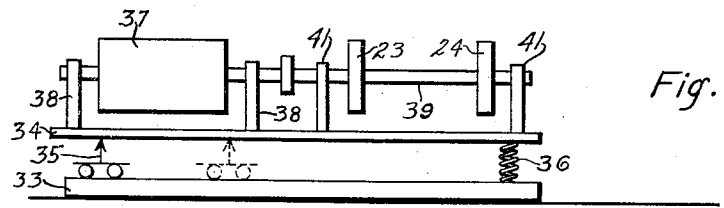
Fig. 3.
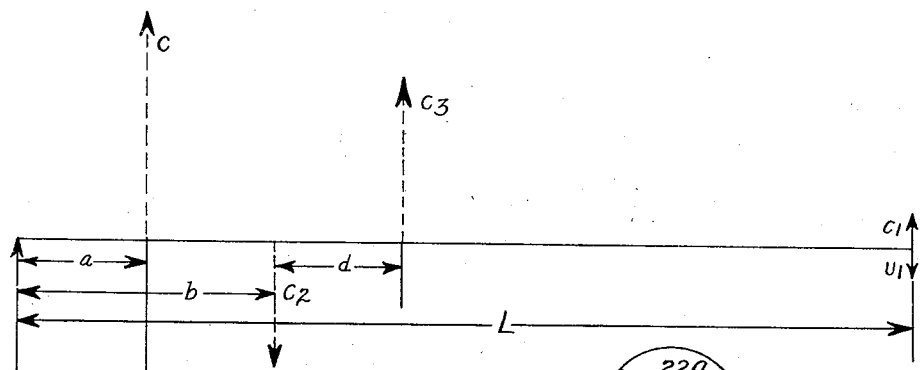
Fig. 5.
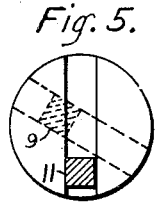
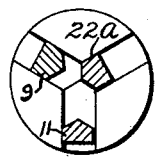
Fig. 6.
Fig. 4.
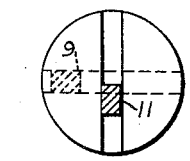
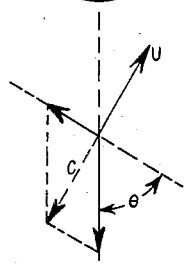
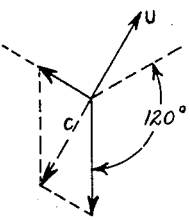
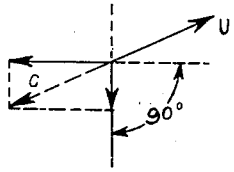
Fig. 7.
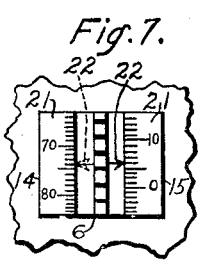
WITNESSES:
R. S. Williams
W. D. O'Connor
INVENTOR
William E. Trumpler
BY
Wesley J. Carr
ATTORNEY Patented Dec. 10, 1929

1,739,105

UNITED STATES PATENT OFFICE

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA

BALANCING MACHINE

Application filed March 31, 1926. Serial No. 98,747.

My invention relates to balancing machines and particularly to counter-balancing heads therefor and means for manipulating the heads to balance rotatable bodies while they are in motion.

An object of my invention is to provide a counter-balancing head for balancing machines that is adapted to determine the amount of, and position, for the application of a plurality of correction weights to dynamically balance a rotor being tested.

Another object of my invention is to provide a balancing head that may be easily and accurately adjusted while the balancing machine is in operation.

A further object of my invention is to provide a balancing head in which the speed of approach to the balanced condition is uniform for all degrees and positions of unbalance, thereby making the operation of the machine simple and accurate.

Another object of my invention is to provide a balancing head that is adapted to balance rotors having a limited number of angularly disposed positions that are convenient for attaching balancing weights, by indicating the amount of weight necessary for attachment at two or more different points to correct the unbalance in the rotor being tested.

In certain devices used heretofore for testing the dynamic balanace of rotors, it has been customary to mount the rotor in journals on an oscillatable bed member in such a manner that an unbalanced mass in the rotor will manifest itself by setting up oscillations of the system comprising the bed member, rotor and spring mounting. One method of balancing the rotor was to arbitrarily add correction weights and note the result on the amplitude of the oscillations, changing the amount and position of the weights until the oscillations disappeared or became negligible.

An improvement on this system comprises mounting the oscillatable bed on a fulcrum member that was adapted to be moved into any transverse plane of the rotor being tested. By setting the fulcrum in one plane, such as an end face plane of the rotor, any unbalance in that plane would not affect the oscillations of the bed member. Correction weights might then be applied on another transverse plane, such as the other end face, to neutralize the parasitic mass existing there. By shifting the fulcrum member to the plane in which the balancing weights were applied and applying other correction weights to the rotor in the first-named plane, the remaining unbalance in the rotor might be completely neutralized.

Instead of the cut-and-try method of applying weights directly to the rotor, a device was developed for introducing an artificial unbalance to neutralize the actual unbalance in the rotor and was arranged to be adjusted while the system was rotating. One form of this arrangement depended for its adjustment upon weights that were movable circumferentially and also parallel to the axis of the rotor to effect the proper adjustment.

However, this device had the disadvantage of changing the inertia of the vibrating system when large unbalances were to be corrected and was unsatisfactory from a practical standpoint because of the difficulties involved in guiding the movable weights. A further difficulty common to all balancing devices using circumferential motion arose from the inertial forces set up in starting and stopping the machine. These forces acted directly against the adjusting mechanism and often resulted in shifting the adjustment.

In the device embodying my present invention these difficulties are overcome by the use of a balancing unit having weights that have a fixed angular and axial position with respect to the rotor being tested.

My present invention resides in the use of a plurality of balancing weights that are adapted to be moved radially along angularly disposed paths to counter-balance and determine the magnitude of the unbalanced mass in any one transverse plane of the rotor being tested.

My invention further provides means for determining the correction weights for application at a plurality of definite positions to balance rotatable objects such as crank shafts for six-cylinder engines wherein it is desirable to make the corrections on the crank throws.

Figure 2:
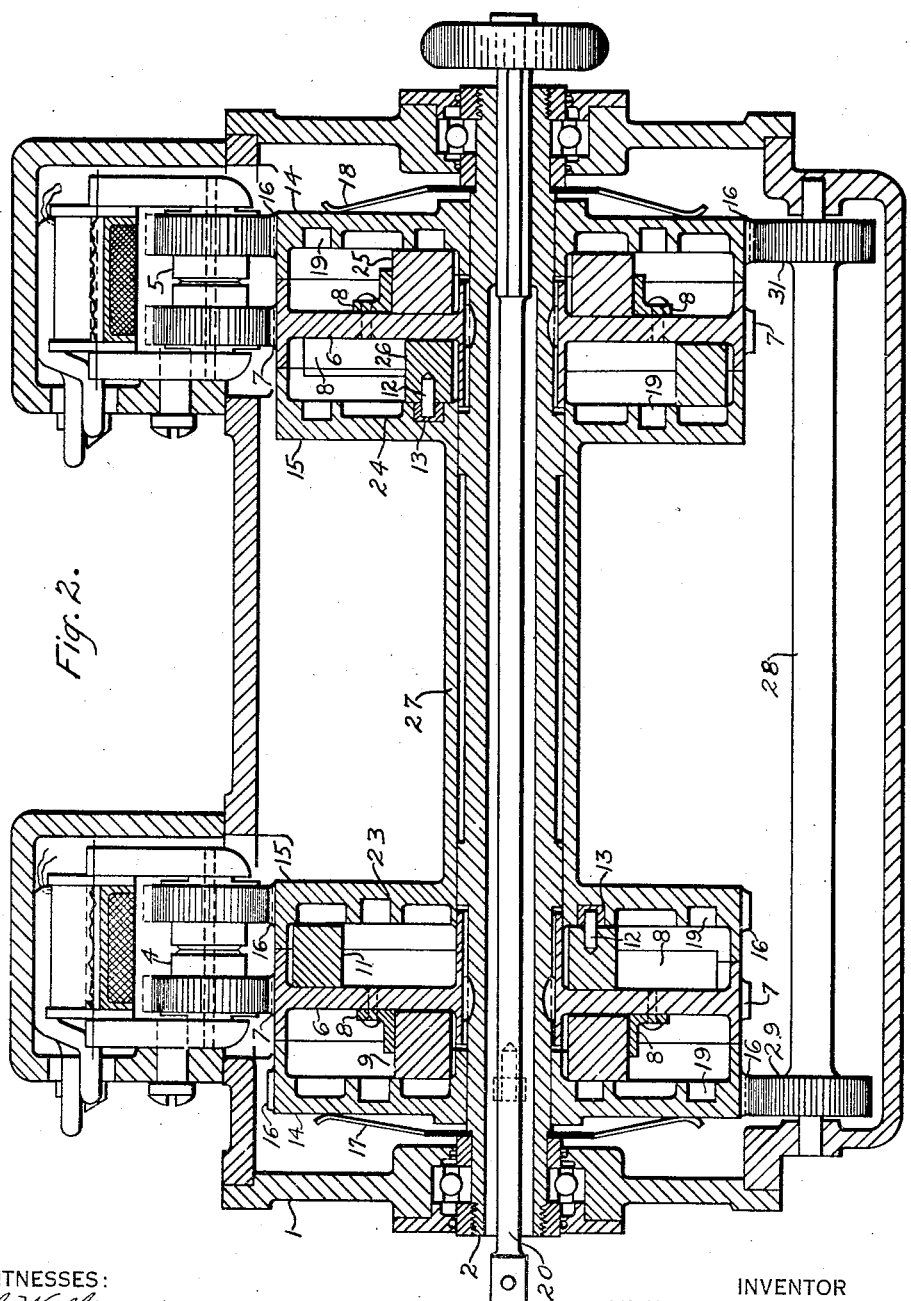

In the accompanying illustrations,

Figure 1 is a view in cross-section of a balancing head for a balancing machine embodying my invention, Fig. 2 is a view in cross-section of a modified form of balancing head embodying my invention, Fig. 3 is a combined diagrammatic view of a balancing machine and force diagram showing the centrifugal moments acting, Fig. 4 is a diagrammatic view of the counter-balancing head of Fig. 1 and a graphical representation of the centrifugal forces acting.

Fig. 5 and Fig. 6 are diagrammatic views of modified forms of balancing heads and corresponding graphical representations of the centrifugal forces acting, and Fig. 7 is a fragmental view of the balancing head showing the indicating device.

Referring to the drawings, the balancing head embodying my invention comprises a casing 1 for mounting on a balancing machine bed (not shown), a central quill 2, a balancing unit 3 mounted on the quill and creeping relays 4 and 5 for co-operating with the balancing unit.

The balancing unit 3 comprises a web or plate 6 that is provided with gear teeth 7 on its outer periphery and is keyed to the quill 2. The plate 6 has radial guide members 8 riveted on either side thereof, said guide members being disposed at substantially right angles to one another. Balancing weights 9 and 11, which are provided with pins 12 and bushings 13 therefore, are mounted between the guide members 8 in such manner that they are free to move along diameters of the plate 6.

Transmission disks 14 and 15, which are provided with gear teeth 16 on their outer peripheries, are journalled on the quill 2 at either side of the plate 6 and are held in frictional engagement therewith by means of flat springs 17 and 18 that are mounted on the quill 2. Spiral grooves 19 are provided on the inner faces of the disks 14 and 15 to engage the bushings 13 on the balancing weights 9 and 11 for displacing said weights radially, as described in my copending application, Serial No. 91,769, filed March 2, 1926, and assigned to the Westinghouse Electric and Manufacturing Company.

The two creeping relays 4 cooperate with the plate 6 and the transmission disk 15 to effect an angular displacement between them in either direction. The creeping relays 5 serve to similarly displace the disk 14 with respect to the plate 6 as described in the copending application, Serial No. 111,922, filed May 27, 1926, and assigned to the Westinghouse Electric & Manufacturing Company.

A drive spindle 20 is secured within the quill 2 for connecting it to the rotor being tested.

Referring to Fig. 7, suitable scales 21 are provided on the peripheries of the transmission disks 14 and 15 for indicating the angular displacement of each transmission disk with respect to the plate 6 and, therefore, the radial position of the weights 9 and 11, by means of arrows or pointers 22 on the periphery of the plate 6. The transmission disks 14 and 15 are constructed preferably of light-weight material, so that inertial forces set up during the starting or stopping periods will not exceed the frictional resistance between the disks and the plate 6. In Fig. 4 the balancing unit 3 and the weights 9 and 11 are illustrated diagrammatically and in Fig. 5 is illustrated a modified form of balancing unit in which the paths of the weights are disposed at an angle $\theta$ less than 90°.

Referring to Figs. 4 and 5, an unbalanced centrifugal force U may be completely neutralized by manipulating the balancing weights 9 and 11 by means of the relays 4 and 5 so that the resultant of the centrifugal forces exerted by them will equal a force C which is equal and opposite to the unbalancing centrifugal force U. By reference to the scales 21 and pointers 22, the counterbalancing force C may be determined, and translated by a simple calculation of centrifugal moments, to C for any transverse plane of the rotor being tested.

In Fig. 6 a modified form of balancing head embodying three balancing weights 9, 11 and 22a that are adapted to be moved along paths substantially 120° apart, is illustrated. In this type of balancing head, the unbalanced centrifugal force U may, in general, be counter-balanced by adjusting two of the three weights in a manner very similar to that illustrated in Fig. 4. This arrangement is useful for balancing rotatable bodies that have but three convenient positions for attaching balancing weights.

In balancing such a rotatable object, for instance a crank-shaft for a six-cylinder engine, the balancing head is connected to the rotor in such manner that the paths of the balancing weights are in the axial planes corresponding to the positions adapted to receive the correction weights. The two correction weights are determined by reference to the scales on the transmission disks and are applied directly to their corresponding positions on the rotor. It may be seen that this method of balancing is very convenient in the case of the crank-shaft mentioned above, as excess weight may be removed directly from the crank throws to effect the balance.

Another method of balancing six-cylinder engine crank-shafts is to purposely unbalance the shaft in a position between two crank throws, and so mount it in a machine using the balancing head shown in Fig. 5, that the unbalance lies in an axial plane within the obtuse angle formed by the paths of the balancing weights. The unbalance is then determined as described, and corrections made by removing metal from the two crank throws adjacent to the artificial unbalance. In the case of a rotor for electrical machinery, it is necessary to provide only the three positions for attaching counter-balancing weights, in contrast to the large number of positions that are usually provided.

Referring to Fig. 2, the device illustrated is a modification of the device of Fig. 1, the details of the two devices being very similar. It comprises the casing 1, quill 2, balancing units 23 and 24 that are located in spaced transverse planes, and the two pairs of creeping relays 4 and 5. The balancing unit 23 is identical with the balancing unit 3 of Fig. 1. The balancing unit 24 differs from the unit 23 only in that the radially movable weights 25 and 26 are of slightly different magnitude than the corresponding weights 9 and 11.

A sleeve member 27 that surrounds quill 2 is provided for mechanically (preferably integrally) connecting the disks 15, and a countershaft 28, having pinions 29 and 31 for engaging the gear teeth 16 on the peripheries of the disks 14, serves to connect these members for synchronous operation. The two creeping relays 4 serve to displace the disks 15 with respect to the plates 6 in both the balancing units 23 and 24 in either direction and to move the weights 11 and 26 simultaneously in opposite directions in the same axial plane. The creeping relays 5 co-operate with the disks 14 and the plates 6 in both balancing units because of the countershaft 28 and move the weights 9 and 25 in opposite directions in an axial plane substantially at right angles to the plane occupied by the weights 11 and 26.

The operation of the device may be best understood by referring to Fig. 3, which illustrates a balancing machine comprising a base 33, and an oscillatable bed member 34 that is mounted on the base 33 by means of a movable fulcrum member 35 and a spring member 36. A rotor 37 is journalled on pedestals 38 that are mounted on the bed member 34 and has in axial alinement therewith, a balancing head 39 that comprises the balancing units 23 and 24, which are journalled on pedestals 41. With the fulcrum member 35 in the position shown in full lines, an unbalanced centrifugal moment equal to $Ua$ is present in the rotor, as represented in the moment diagram.

The parasitic mass that causes the unbalanced centrifugal moment is not necessarily located in the end plane of the rotor, as indicated, but may be corrected for in this plane by the addition of a mass that exerts the centrifugal force C and the centrifugal moment $Ca$, which is equal and opposite to the unbalanced moment $Ua$. In the cut-and-try method of balancing, this centrifugal force C is obtained by applying different weights to the rotor and shifting them about until a satisfactory balanced condition is indicated by a low amplitude of oscillation of the bed member. By the use of the balancing head, the centrifugal moment $Ca$ may first be obtained by adjusting the balancing units while the rotor being tested is in motion, and the rotor then balanced by attaching counterweights in accordance with the amount and positions indicated by the balancing head.

In the single unit device illustrated in Fig. 1, the centrifugal moment is equal to the centrifugal force in the balancing unit multiplied by its distance from the fulcrum member. This distance is quite different for the different positions of the fulcrum member and necessitates a different calculation for each position. By using the double unit device illustrated in Figs. 2 and 3, it is possible to so adjust the units that the centrifugal moment $Ca$ is equivalent to the moment of a relatively small force $C_1$ acting upon a long lever arm.

Referring to the moment diagram, the counterbalancing centrifugal moment $Ca$ is equal to $C_3(b+d) - C_2b$, which is equal to the moment produced by a centrifugal force $C_1$ acting at a distance L from the fulcrum, the force $C_1$ being equal to $C_3 - C_2$. The distance L may be computed as follows:

$$C_1 L = C_3(b+d) - C_2 b$$
$$L = \frac{C_3 b + C_3 d - C_2 b}{C_1}$$

since $$C_1 = C_3 - C_2$$
$$L = \frac{(C_3 - C_2)b + C_3 d}{C_3 - C_2} = b + \frac{C_3 d}{C_1}$$

From this result, it is seen that the lever arm L may be made any length desired by properly arranging the weights and distances in the balancing head. The distance L is ordinarily made so large that the distance A through which the fulcrum is moved from one position to the other is a negligible portion of the lever. As the lever arm of the counterbalancing moment $Ca$ is the same for both positions of the fulcrum 35, and the lever arm L differs by a negligible amount for the two positions, it is clear that the same calculation may be used for determining the correction weight to be applied to either end of the rotor being tested, without introducing an error large enough to be detected in practical operation.

To perform the operation of balancing, the movable fulcrum 35 is placed in one of the transverse end planes of the rotor, upon which it is convenient to attach correction weights as indicated by the full lines in Fig. 3. The rotor is then actuated and the degree of unbalance noted by observing the amplitude of the oscillations of the bed member. One pair of counterweights, for instance 11 and 26, is then adjusted by means of the creeping relays 4 until the vibration of the bed member 34 reaches the lowest amplitude obtainable. The second pair of counterbalancing weights 9 and 25 is then adjusted by means of the relays 5 to further reduce the unbalance and observed oscillations. By correcting further on the first pair of counterbalancing weights and continuing the process in this manner, the balance may be brought to the desired degree of refinement.

The rotor is then stopped and the amount and position of the correction weight for one end of the rotor determined from the scales 21 on the peripheries of the adjusting disks 14 and 15. The fulcrum member 35 is then moved into the plane for which the correction weight has just been determined, as indicated by the dotted lines in Fig. 3, and the process repeated to obtain the amount and position of the correction weight for the other end of the rotor. The correction weights may be attached while the rotor is mounted on the balancing machine, the balancing weights set at the midposition, and the rotor actuated to test the accuracy of the work; or the rotor may be removed to a more convenient place for adding or removing the necessary material.

It is evident from the above description that my invention provides ample and efficient means for determining the amount and location of unbalanced masses in rotating bodies in an expedient manner, which obviates the cut-and-try method heretofore utilized and permits the balancing of rotors in production quantities with uniform results and a high degree of accuracy, without depending entirely upon the skill of the operator.

Although I have described specific embodiments of my invention, it will be obvious to those skilled in the art that further modifications may be made in the details of construction without departing from the principles of the invention as set forth in the appended claims.

I claim as my invention:

1. In a counterbalancing head for balancing machines, the combination with two balancing weights adapted to be moved at right angles to each other, of means for radially adjusting the position of the weights while the balancing head is rotating.

2. In a counterbalancing head for balancing machines, the combination with two balancing weights adapted to be moved at right angles to each other in adjacent planes perpendicular to the axis of rotation, of means for radially adjusting the position of the weights while the balancing head is rotating.

3. In a counterbalancing head for balancing machines, a plurality of balancing weights adapted to be moved radially in parallel transverse planes, and means for adjusting the position of the weights while the balancing head is rotating.

4. In a counterbalancing head for balancing machines, a plurality of balancing weights adapted to be moved radially along angularly disposed paths while the balancing head is rotating.

5. In a counterbalancing head for balancing machines, two weights adapted to be moved at right angles to one another while the counterbalancing head is rotating.

6. In a counterbalancing head for balancing machines, two weights adapted to be moved at right angles to one another in adjacent planes perpendicular to their common axis of rotation while the counterbalancing head is rotating.

7. In a balancing machine, a drive spindle, counterbalance weights associated with said drive spindle and radially movable in adjacent planes perpendicular to the spindle, and means for adjusting said weights to balance the parasitic mass of the body being tested.

8. A counterbalancing head comprising a shaft, a plate mounted on the shaft and having radial guide members on the sides thereof substantially at right angles to each other, balancing weights engaging the guide members, and transmission disks journalled on the shaft adjacent to the balancing weights and having means for engaging the balancing weights to move them radially, and means for angularly displacing the transmission disks with respect to the plate while the balancing head is rotating.

9. A counterbalancing head comprising a counterbalancing member rotatably mounted therein and having angularly disposed radial guide members, balancing weights engaging the guide members, and means for independently adjusting the balancing weights while the balancing member is rotating.

10. In a counterbalancing head for balancing machines, the combination with two balancing weights adapted to be moved radially along angularly disposed paths in adjacent planes perpendicular to the axis of rotation, of means for radially adjusting the positions of the weights while the balancing head is rotating.

11. A balancing machine that comprises an oscillatable bed member, a movable fulcrum member and a resilient member for supporting said bed member, means on the bed member for rotatably supporting a rotor to be tested, angularly disposed pairs of unequal balancing weights associated with the rotor, the weights in each pair being movable radially in opposite directions and in spaced planes perpendicular to the axis of rotation and means for moving the pairs of weights while the system is rotating.

12. In a balancing machine, a counterbalancing head comprising a pair of unequal balancing weights and means for adjusting said weights radially in opposite directions and in spaced planes perpendicular to the axis of rotation.

In testimony whereof, I have hereunto subscribed my name this 22nd day of March, 1926.

WILLIAM E. TRUMPLER.